United States Patent [19]

Kobayashi

[11] Patent Number: 5,076,779
[45] Date of Patent: Dec. 31, 1991

[54] SEGREGATED ZONING COMBUSTION

[75] Inventor: Hisashi Kobayashi, Putnam Valley, N.Y.

[73] Assignee: Union Carbide Industrial Gases Technology Corporation, Danbury, Conn.

[21] Appl. No.: 684,289

[22] Filed: Apr. 12, 1991

[51] Int. Cl.⁵ .................................... F23D 14/00
[52] U.S. Cl. ............................ 431/5; 431/8; 431/175
[58] Field of Search ............ 431/5.8, 10.9, 181, 431/187, 190, 351, 278, 283, 284; 239/8, 418, 419.5, 423, 424.5, 433; 110/261, 260, 347, 348

[56] References Cited

U.S. PATENT DOCUMENTS

| | | | |
|---|---|---|---|
| 4,378,205 | 3/1983 | Anderson | 431/5 |
| 4,408,982 | 10/1983 | Kobayashi et al. | 431/10 |
| 4,439,137 | 3/1984 | Suzuki et al. | 431/8 |
| 4,496,306 | 1/1985 | Okigami et al. | 431/8 |
| 4,541,796 | 9/1985 | Anderson | 431/187 |
| 4,863,371 | 9/1989 | Ho | 431/9 |
| 4,878,829 | 11/1989 | Anderson | 431/8 |
| 4,907,961 | 3/1990 | Anderson | 431/8 |
| 4,946,382 | 8/1990 | Kobayashi et al. | 431/8 |
| 4,957,050 | 9/1990 | Ho | 110/346 |
| 4,969,814 | 11/1990 | Ho et al. | 431/8 |
| 4,973,346 | 11/1990 | Kobayashi | 65/135 |
| 4,988,285 | 1/1991 | Delano | 431/5 |

Primary Examiner—James C. Yeung
Attorney, Agent, or Firm—Stanley Ktorides

[57] ABSTRACT

A combustion method wherein separate oxidant mixing zones and fuel reaction zones are established in a combustion zone to dilute oxidant and combust fuel under conditions which dampen $NO_x$ formation.

18 Claims, 3 Drawing Sheets 5,076,779

SEGREGATED ZONING COMBUSTION

TECHNICAL FIELD

This invention relates generally to the field of combustion and more particularly to combustion in a furnace.

BACKGROUND ART

The basic mechanisms of nitrogen oxides ($NO_x$) formation in combustion processes have been studied extensively and many methods are known for reducing $NO_x$ emissions from combustion sources. For reduction of "thermal $NO_x$", or $NO_x$ formed from the reactions of molecular nitrogen and oxidants, reduction of peak flame temperature is considered to be the key requirement. From the theoretical point of view, the lowest $NO_x$ emission can be obtained when the combustion reactions proceed homogeneously throughout the furnace at the lowest temperature permissible for the combustion process. In conventional practice, fuel and oxidant are introduced from a burner into a furnace to produce a stable flame where intense combustion reactions take place. When fuel and oxygen are post mixed, combustion reactions takes place at the boundaries of small fuel and oxygen fluid fragments created by turbulence. Local temperature at the flame front often approaches the theoretical flame temperature and hence a high level of $NO_x$ is formed.

One effective way for suppressing the flame temperature is to reduce the fuel and/or oxygen concentrations at the flame front by dilution with other non-reacting gases. Recirculation of flue gas by mixing with fuel or oxidant prior to the introduction of fuel or oxidant streams into a burner is an effective way to reduce $NO_x$. In-furnace-dilution of fuel or oxygen by burner design is also practiced. Many known methods for reduction of $NO_x$ deal with improvements in the method of mixing fuel and oxidant at or near the burner to reduce the peak flame temperature. The $NO_x$ emission levels achieved by such known methods are still substantially above the lowest possible levels predicted for the ideal homogeneous reactor in which the temperature and species concentrations are uniform throughout the furnace and combustion reactions take place uniformly.

A combustion method which can enable low $NO_x$ generation, closer to the low ideal rate than can known combustion methods, is desirable.

Accordingly, it is an object of this invention to provide an improved combustion method wherein combustion can be carried out with low $NO_x$ generation.

SUMMARY OF THE INVENTION

The above and other objects which will become apparent to one skilled in the art upon a reading of this disclosure are attained by:

A method for carrying out combustion with low $NO_x$ generation comprising:

(A) providing a combustion zone containing an atmosphere of furnace gases at a temperature exceeding 1000° F.;

(B) injecting into the combustion zone an oxidant stream and mixing furnace gases with the injected oxidant in an oxidant mixing zone within the combustion zone to produce an oxidant mixture having an oxygen concentration which is not more than 10 percent;

(C) flowing the oxidant mixture out from the oxidant mixing zone to provide additional furnace gases to the combustion zone;

(D) injecting into the combustion zone a fuel stream, mixing furnace gases with the injected fuel in a fuel reaction zone within the combustion zone, and carrying out combustion with low $NO_x$ generation within the fuel reaction zone to produce a fuel reaction mixture;

(E) flowing the fuel reaction mixture out from the fuel reaction zone to provide additional furnace gases to the combustion zone;

(F) creating sufficient mixing within the combustion zone so that the composition of the atmosphere at points within the combustion zone outside of the oxidant mixing zone and the fuel reaction zone is substantially the same; and (G) maintaining the oxidant mixing zone and the fuel reaction zone segregated within the combustion zone.

DETAILED DESCRIPTION

The invention comprises the establishment of at least one oxidant mixing zone and at least one fuel reaction zone within a furnace or combustion zone and maintaining the oxidant mixing zone or zones separate or segregated from the fuel reaction zone or zones while the combustion is carried out. The invention further comprises the dilution of oxidant with furnace gases and the combustion of fuel under conditions which avoids high fuel and oxygen concentrations thus avoiding the conditions which favor $NO_x$ formation. The fuel and oxidant are injected into the combustion zone in a manner to create sufficient mixing within the combustion zone so that there is a substantially uniform combustion zone atmosphere outside of the oxidant mixing and fuel reaction zones. In a preferred embodiment, fuel and oxidant are injected into the furnace or combustion zone oriented such that a strong recirculation flow is set up within the furnace or combustion zone.

Figure 1:
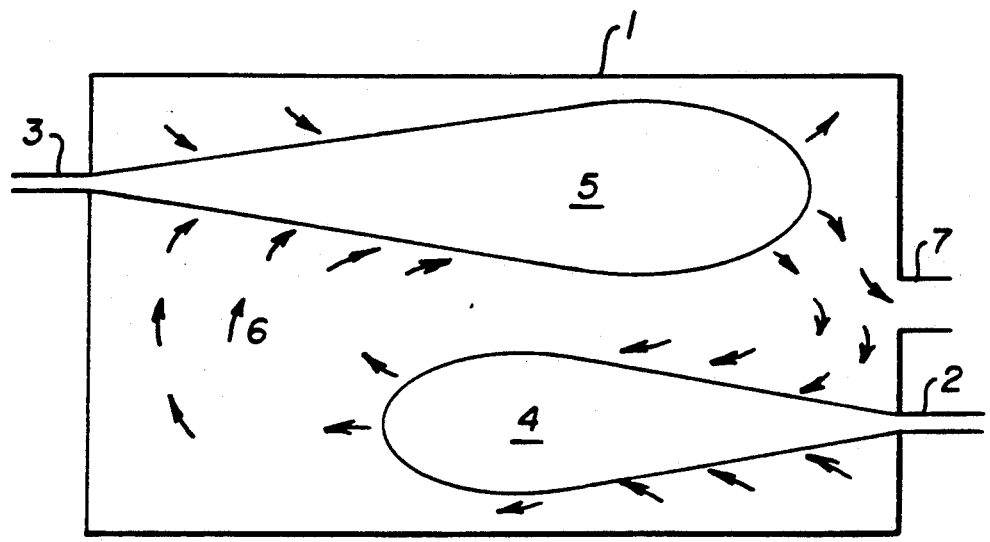
FIGS. 1–8 are simplified schematic representations of various configurations which may be employed in the practice of the invention.
Figure 2:
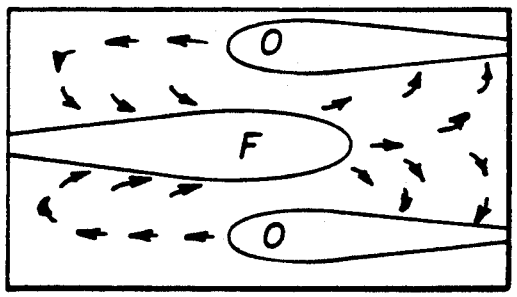
Figure 3:
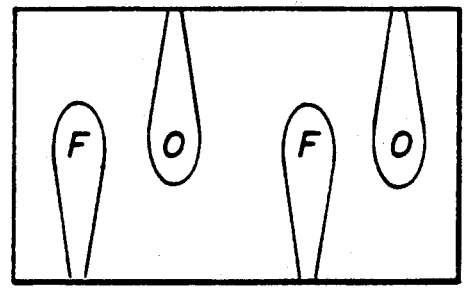
Figure 4:
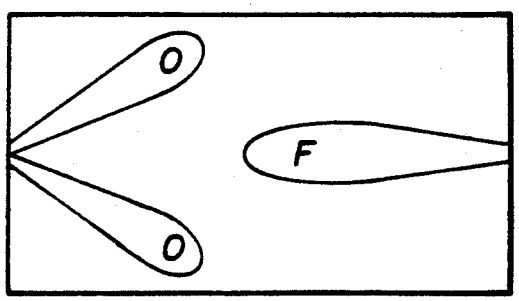
Figure 5:
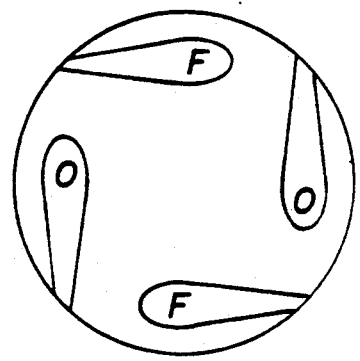

The invention will be described in detail with reference to FIG. 1. Referring now to FIG. 1 combustion zone 1 contains an atmosphere 6 of furnace gases. Typical examples of combustion zones wherein the method of this invention may be effectively practiced include steel reheating furnaces, glass melting furnaces, aluminum remelting furnaces, incinerators, and other industrial furnaces which operate with furnace temperatures above 1000° F. The furnace gases which comprise the atmosphere within the combustion zone comprise ambient gases which infiltrate into the combustion zone and gases from the oxidant mixture and fuel reaction mixture which will be later more fully described. Individual species which may be present as furnace gases within the combustion zone include oxygen, nitrogen, carbon dioxide, water vapor, argon and other minor species such as nitrogen oxides, sulfur oxides, carbon monoxide and hydrogen.

The temperature of the atmosphere within the combustion zone exceeds 1000° F., and preferably exceeds 1400° F. The optimum minimum temperature will vary, for example, with the type of fuel used. The temperature is maintained by the combustion within the fuel reaction zone and by recirculation of gases within the combustion zone. By maintaining the temperature of the furnace gases within the combustion zone above 1000° F., a separate ignition source is not necessary once the combustion has been first started. In this way, even the dilute mixture in the fuel reaction zone can be combusted smoothly and homogeneously thus contributing to the low $NO_x$ generation achieved by the invention.

Oxidant 2 is injected into the combustion zone. The oxidant may be any effective oxidant, including air, oxygen-enriched air having an oxygen concentration greater than that of air, or technically pure oxygen having an oxygen concentration of 99.5 percent or more. The preferred oxidant has an oxygen concentration of at least 90 percent. The oxidant is injected into the combustion zone with a velocity sufficient to entrain or mix furnace gases with the injected oxidant. Generally the velocity of the oxidant will be at least 200 feet per second (fps) and preferably will be within the range of from 250 to 1000 fps. The velocity of the oxidant is such that sufficient furnace gases mix with the injected oxidant to dilute the oxygen concentration of the oxidant so that an oxidant mixture is produced having an oxygen concentration of not more than 10 percent and preferably not more than 5 percent. For example, if air is the oxidant, the initial oxygen concentration of the oxidant is about 21 percent. If the average oxygen concentration of furnace gas entrained into the oxidant stream is 2 percent and 20 moles of furnace gas is mixed per mole of oxidant, the oxygen concentration after mixing becomes about 2.9 percent. When pure oxygen or oxygen enriched air is used as the oxidant, higher entrainment of the furnace gas is required to reduce the oxygen concentration to the same level. No combustion reaction takes place since the furnace atmosphere entrained into the oxidant jet is substantially free of fuel.

The furnace gases mix with or are entrained into the oxidant due to the turbulence or the aspiration effect caused by the high velocity of oxidant stream. The mixing of the furnace gases with the injected oxidant occurs within an oxidant mixing zone shown as 4 in FIG. 1. The arrows pointed toward oxidant mixing zone 4 depict the furnace gases being drawn into oxidant mixing zone 4 to mix therein with the oxidant.

The resulting oxidant mixture, containing a significantly lower concentration of oxygen than was present in the injected oxidant, flows out from oxidant mixing zone 4, and serves to form part of the atmosphere within combustion zone 1. That is, the oxidant mixture provides additional furnace gases to the combustion zone.

Fuel 3 is injected into the combustion zone. The fuel may be gaseous, liquid or fluid supported fine solids and may be any fluid which combusts with oxidant. Preferably, the fuel is gaseous. Among the many fuels which may be employed in the practice of this invention one can name methane, propane, coke oven gas, fuel oil and pulverized coal.

Furnace gases from the atmosphere within the combustion zone flow into, as shown by the arrows in FIG. 1, and mix with the fuel stream injected into the combustion zone due to the turbulence caused by the fuel stream injection, and the oxygen within the furnace gases combusts with fuel in fuel reaction zone 5.

Fuel reacts with oxygen molecules contained in the furnace gases spontaneously as the temperature of furnace gas is above the auto-ignition temperature of fuel and oxygen. Since the oxygen concentration in furnace gas is very low, combustion reactions proceed slowly and the flame temperature is kept low due to the presence of the large number of non-reacting molecules ($CO_2$, $H_2O$, $N_2$) in the fuel reaction zone. For example, if the fuel is methane and the average concentration of oxygen in the furnace gas entrained into the fuel reaction zone is 3 percent, 67 volumes of furnace gas is required per volume of fuel to complete the combustion reactions.

As mentioned, it is preferred that the temperature within the combustion zone exceed 1400° F. At temperatures below 1400° F. it is possible that certain flame instabilities may arise. In such a situation the injection into the combustion zone proximate the fuel stream of a small amount of oxidant as stabilizing oxidant, such as an annular oxidant stream around the fuel stream, may be desirable to cure any flame instabilities which may arise.

The combustion of fuel and oxygen under the conditions prevailing in the fuel reaction zone produces combustion reaction products such as carbon dioxide and water vapor but produces very little nitrogen oxides. The actual amount of nitrogen oxides produced will vary with each particular situation and will depend upon such factors as the furnace gas temperature and the reaction time.

The resulting fuel reaction mixture including the combustion reaction products flows out of the fuel reaction mixture as indicated by the arrows in FIG. 1 and serves to form part of the atmosphere within combustion zone thus providing additional furnace gases to the combustion zone. Within the fuel reaction zone the fuel undergoes substantially complete combustion so that there is no significant amount of uncombusted or incompletely combusted fuel in the combustion zone outside of the fuel reaction zone.

It is important in the practice of this invention that the oxidant mixing zone and the fuel reaction zone be maintained separate from each other or segregated within the combustion zone. In this way combustion is restricted primarily to the fuel reaction zone and under conditions which dampen $NO_x$ formation. Although the various steps of the method have been described in separate sequential fashion for purposes of clarity, it is appreciated by those skilled in the art that the steps of the method are conducted substantially simultaneously.

The oxidant mixing zone and the fuel reaction zone can be maintained segregated by positioning the injection points and orienting the injection directions of the fuel and oxidant so as to avoid integration or overlap prior to the requisite dilution within the oxidant mixing zone or the requisite substantially complete combustion within the fuel reaction zone. FIGS. 2–8 illustrate a variety of different injection points and injection angles, in addition to those illustrated in FIG. 1, which may be used. In FIGS. 2–8, O designates an oxidant mixing zone and F designates a fuel reaction zone.

The fuel and oxidant are injected into the combustion zone in a manner to achieve sufficient mixing within the combustion zone so that the combustion zone atmosphere outside of the oxidant mixing zone and fuel reaction zone is substantially homogeneous. In a particularly preferred embodiment, the fuel and oxidant are injected into the combustion zone in a manner to promote a recirculating pattern of the furnace gases within the combustion zone. This contributes to improved temperature distribution and gas homogeneity within the combustion zone and improves the mixing within the oxidant mixing zone and fuel reaction zone resulting in smoother combustion and retarding $NO_x$ formation. With optimum furnace gas recirculation within the combustion zone, the composition of the flue gas taken out of the combustion zone such as through flue 7 in FIG. 1 is substantially the same as the composition of the atmosphere at points within the combustion zone outside of the oxidant mixing zone and fuel reaction zone. The recirculation pattern promotes the entrainment of the furnace gases downstream of the fuel reaction zone into the oxidant stream and the entrainment of the furnace gases downstream of the oxidant mixing zone into the fuel stream.

Figure 6:
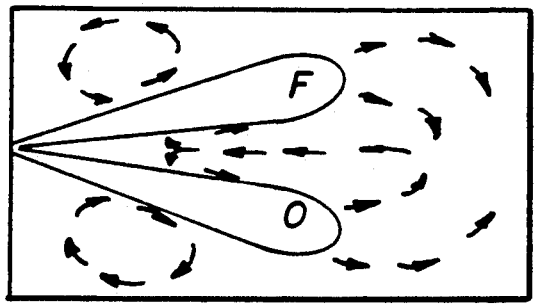
Figure 7:
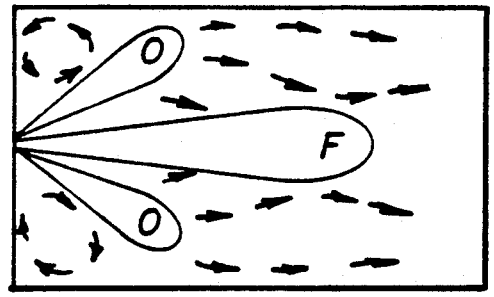
Figure 8:
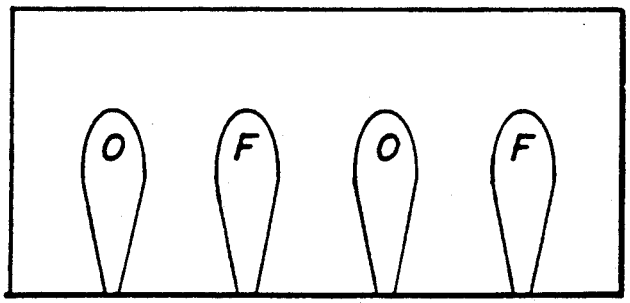

As mentioned, FIGS. 2-8 illustrate examples of other embodiments of the invention. FIGS. 2-5 show cases with alternating multiple fuel and oxidant streams. FIGS. 6 and 7 show examples where oxidant and fuel injection points are located close to each other and injected from the same furnace wall. In such cases it is particularly important to inject both oxidant and fuel streams at high velocities away from each other so that the oxidant mixing zone and fuel reaction zone do not overlap. Since the dominant jet with a high momentum flux tends to overwhelm and entrains the weaker jet with a substantially lower momentum flux, the ratio of a fuel and oxidant momentum fluxes must be kept within 1/5 to 5 when injected from close proximity. FIG. 8 shows an example where both oxidant and fuel are injected from the same wall with sufficient spacings between any two jets.

The following examples are presented for illustrative purposes and are not intended to be limiting.

A series of combustion tests of the method of this invention were carried out in a refractory-lined cylindrical test furnace having an internal diameter of 3 feet and a length of 7 feet 8 inches.

Tests were conducted using natural gas as fuel and technically pure oxygen as oxidant at a constant firing rate of about 700 SCFH of natural and at a constant furnace wall temperature of 2300° F., measured at the midpoint of the cylindrical wall by a thermocouple. Two to four 1.9 inch O.D. water-cooled heat sink pipes were inserted through access holes to simulate the effect of a charge such as glass or steel which would normally be present in the furnace. About 150 to 5000 SCFH of nitrogen was introduced into the furnace through three middle view ports to simulate an actual furnace with various nitrogen concentrations. Oxygen concentration in the flue gas was monitored continuously by an in-situ sensor located at a flue port and kept at 2 to 2.5 percent on a wet basis by adjusting the flow rate of oxygen or natural gas. $NO_x$ was measured by a chemiluminescent type analyzer which was properly calibrated for the effects of the background gases ($N_2$ and $CO_2$).

First, for comparative purposes, combustion was carried out using the commercially very successful low $NO_x$ combustion method disclosed in U.S. Pat. No. 4,378,205 and these results are shown in FIG. 9 as A and B.

Figure 9:
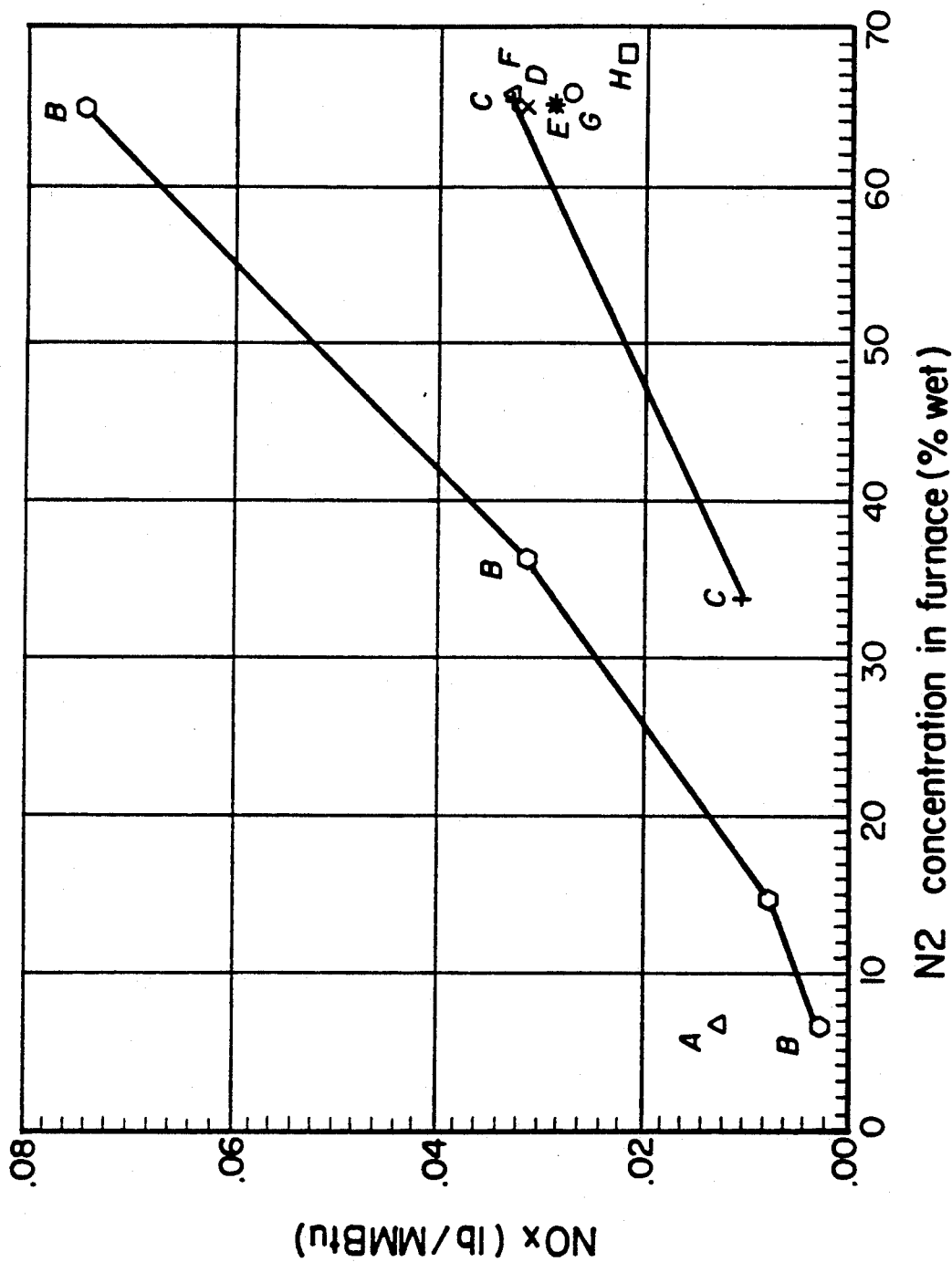
FIG. 9 is a graphical representation of results of a number of tests of the invention.

The results from the Examples of the present invention are denoted in FIG. 9 as C, D, E, F, G and H. The oxidant velocity for the two trials of Example C were 823 fps and 846 fps. The oxidant velocity for Examples D-H were as follows: D-760 fps, E-1054 fps, F-2070 fps, G-2070 fps and H-2449 fps. In Examples C, D and E fuel was injected from one port and oxygen was injected from two oxygen lances located 180 degrees apart in the flue end wall. This arrangement was similar to that depicted in FIG. 2. Different fuel and oxygen nozzles were used. $NO_x$ emission was reduced by about 50 percent compared to the optimized comparative case B. In Examples F and G both fuel and oxygen were introduced from the same area, but special oxygen nozzles with 30 degree diverging angles were used to prevent the interaction of fuel and oxygen jets. This arrangement was similar to that depicted in FIG. 7. In Example H the oxygen nozzles were the same as Example E and fuel was injected opposite from them using a special fuel nozzle with sixteen 0.032" I.D. orifices. This arrangement was similar to that depicted in FIG. 4. The lowest $NO_x$ emission was achieved with this arrangement. It is important to note that low $NO_x$ emissions were achieved in Examples C, D and E without using the very high velocity oxygen jets used in examples F, G and H. Since higher oxygen jet velocities require high oxygen supply pressures, it is desirable to achieve low $NO_x$ emissions without using very high oxygen velocities.

The aim of the present invention is to reduce the formation of $NO_x$ in combustion processes beyond what has been achieved by known methods while providing all of the practical requirements for combustion, i.e., complete reaction of fuel with oxidant, stable reaction and low noise, and high heat transfer efficiency. The invention achieves this by reacting fuel with furnace atmosphere containing a low concentration of oxygen in relatively large spaces within a furnace rather than mixing undiluted oxygen and fuel at or near a conventional post-mix burner and creating an intense flame. For example, 1 mole of methane requires 2 moles of oxygen for stoichiometric combustion. The large amount of hot inactive species contained in furnace gas (i.e., $CO_2$, $H_2O$ and $N_2$) provide a heat source for ignition, reduce the rate of reaction, and provide a heat sink to keep the local flame temperature low.

Although the invention has been described in detail with reference to certain specific embodiments, those skilled in the art will recognize that there are other embodiments of the invention within the spirit and the scope of the claims.

I claim:

1. A method for carrying out combustion with low $NO_x$ generation comprising:
   (A) providing a combustion zone containing an atmosphere of furnace gases at a temperature exceeding 1000° F.;
   (B) injecting into the combustion zone an oxidant stream and mixing furnace gases with the injected oxidant in an oxidant mixing zone within the combustion zone to produce an oxidant mixture having an oxygen concentration which is not more than 10 percent;
   (C) flowing the oxidant mixture out from the oxidant mixing zone to provide additional furnace gases to the combustion zone;
   (D) injecting into the combustion zone a fuel steam, mixing furnace gases with the injected fuel in a fuel reaction zone within the combustion zone, and carrying out combustion with low $NO_x$ generation within the fuel reaction zone to produce a fuel reaction mixture;
   (E) flowing the fuel reaction mixture out from the fuel reaction zone to provide additional furnace gases to the combustion zone;

(F) creating sufficient mixing within the combustion zone so that the composition of the atmosphere at points within the combustion zone outside of the oxidant mixing zone and the fuel reaction zone is substantially the same; and (G) maintaining the oxidant mixing zone and the fuel reaction zone segregated within the combustion zone.

2. The method of claim 1 wherein a plurality of oxidant streams are injected into the combustion zone.

3. The method of claim 2 wherein a plurality of oxidant mixing zones are established within the combustion zone.

4. The method of claim 1 wherein a plurality of fuel streams are injected into the combustion zone.

5. The method of claim 4 wherein a plurality of fuel reaction zones are established within the combustion zone.

6. The method of claim 1 wherein the oxidant is air.

7. The method of claim 1 wherein the oxidant is oxygen-enriched air.

8. The method of claim 1 wherein the oxidant is technically pure oxygen.

9. The method of claim 1 wherein the fuel comprises methane.

10. The method of claim 1 wherein the fuel and oxidant are injected into the combustion zone from different sides of the combustion zone.

11. The method of claim 10 wherein the fuel and oxidant are injected into the combustion zone from opposite sides of the combustion zone.

12. The method of claim 1 wherein the fuel and oxidant are injected into the combustion zone in a manner to set up a recirculating flow within the combustion zone.

13. The method of claim 1 wherein the temperature of the furnace gases exceeds 1400° F.

14. The method of claim 1 wherein the oxidant mixture produced in the oxidant mixing zone has an oxygen concentration which is not more than 5 percent.

15. The method of claim 1 wherein the fuel is substantially completely combusted within the fuel reaction zone.

16. The method of claim 1 wherein the combustion zone atmosphere outside of the fuel reaction zone contains substantially no fuel.

17. The method of claim 1 wherein stabilizing oxidant is injected into the combustion zone proximate the fuel stream.

18. The method of claim 17 wherein the stabilizing oxidant is an annular stream around the fuel stream.

* * * * *